United States Patent [19]
Fuller

[11] Patent Number: 4,967,867
[45] Date of Patent: Nov. 6, 1990

[54] COVER ASSEMBLY FOR MOTORCYCLE AXLE

[76] Inventor: Wyatt S. Fuller, 6289 N.W. 62nd Ter., Parkland, Fla. 33067

[21] Appl. No.: 428,064

[22] Filed: Oct. 27, 1989

[51] Int. Cl.⁵ .............................................. B62K 11/00
[52] U.S. Cl. .................................. 180/219; 280/288; 74/608; 474/144
[58] Field of Search ................. 280/152.1, 152.2, 288, 280/304.3, 848, 852; 301/37 R, 6 CS; 474/144; 74/608, 609, 617; 180/219

[56] References Cited

U.S. PATENT DOCUMENTS

| | | | |
|---|---|---|---|
| 2,023,128 | 12/1935 | Ferris | 280/152.1 |
| 3,724,582 | 4/1973 | Wood | 180/33 R |
| 3,885,471 | 5/1975 | Morine et al. | 74/611 |
| 4,033,627 | 7/1977 | Morroni | 280/288 |
| 4,289,490 | 9/1981 | Nagano | 474/144 |
| 4,723,619 | 2/1988 | Yamamoto et al. | 180/219 |
| 4,744,606 | 5/1988 | Yoshida | 301/6 CS |
| 4,775,272 | 10/1988 | Toth | 411/429 |

FOREIGN PATENT DOCUMENTS 0242054  11/1925  United Kingdom ............... 474/144

Primary Examiner—Charles A. Marmor
Assistant Examiner—A. M. Boehler
Attorney, Agent, or Firm—Oltman and Flynn

[57] ABSTRACT

The present cover assembly is for providing a "custom look" and a safe enclosure for either end of the rear wheel axle on a Harley-Davidson motorcycle. The cover assembly has (1) a recessed cover which fits over and around the parts of the axle that project laterally beyond the adjacent side of the wheel and (2) a mounting bracket to which the cover is attached by screws. The mounting bracket fits on the usual axle adjuster bolt on the motorcycle so that it can be clamped against the usual rear axle/frame horn.

5 Claims, 2 Drawing Sheets

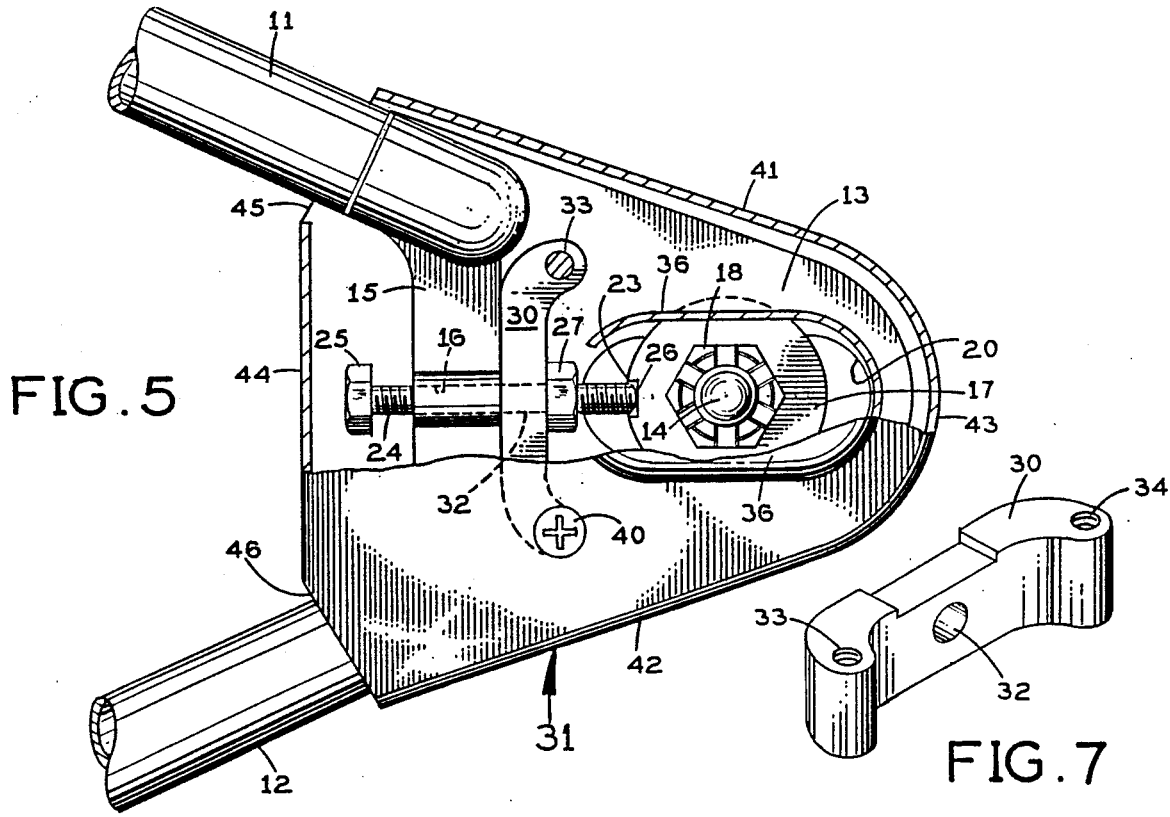
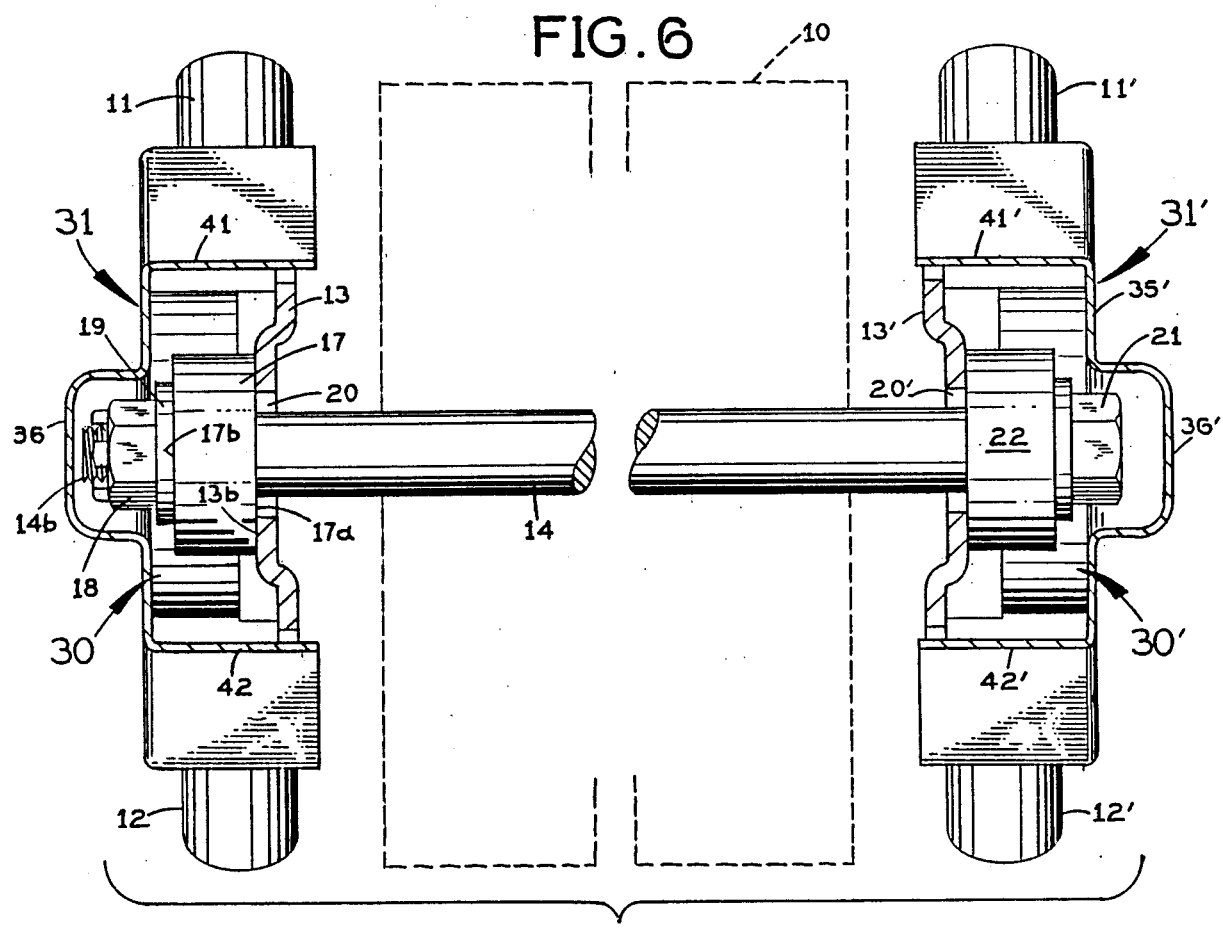

COVER ASSEMBLY FOR MOTORCYCLE AXLE

SUMMARY OF THE INVENTION

This invention relates to a cover assembly for either end of the rear axle of a HARLEY-DAVIDSON motorcycle.

To achieve the "custom look", owners of HARLEY-DAVIDSON motorcycles commonly chrome plate the parts of the rear axle that protrude laterally beyond the wheel, both at the nut end of the axle and at the end where the bolt head is located.

The present invention relates to a cover assembly for achieving the "custom look" at the protruding ends of the rear axle of a HARLEY-DAVIDSON motorcycle and for obviating the possibility that a person's clothes or anything else might get caught on either of these protruding ends of the axle.

In accordance with this invention, the cover assembly comprises a mounting bracket for attachment to the rear axle/frame horn on the motorcycle on the axle adjuster bolt and a cover attached by screws to the bracket and covering the outside of the rear axle/frame horn and the protruding parts of the axle assembly.

A principal object of this invention is to provide a novel cover assembly for covering the protruding parts at either end of the rear axle of a HARLEY-DAVISON motorcycle.

Another object of this invention is to provide such a cover assembly which is readily attachable to the rear axle/frame horn of the motorcycle and requires no modification of the axle assembly of the motorcycle.

Further objects and advantages of this invention will be apparent from the following detailed description of a presently preferred embodiment which is illustrated schematically in the accompanying drawings.

DESCRIPTION OF THE DRAWINGS

FIG. 5 shows the cover broken open to reveal the parts inside;

FIG. 6 is a vertical cross-section taken along the line 6—6 in FIG. 1 and showing the two cover assemblies at the opposite ends of the rear axle; and FIG. 7 is a perspective view of the mounting bracket in this cover assembly.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
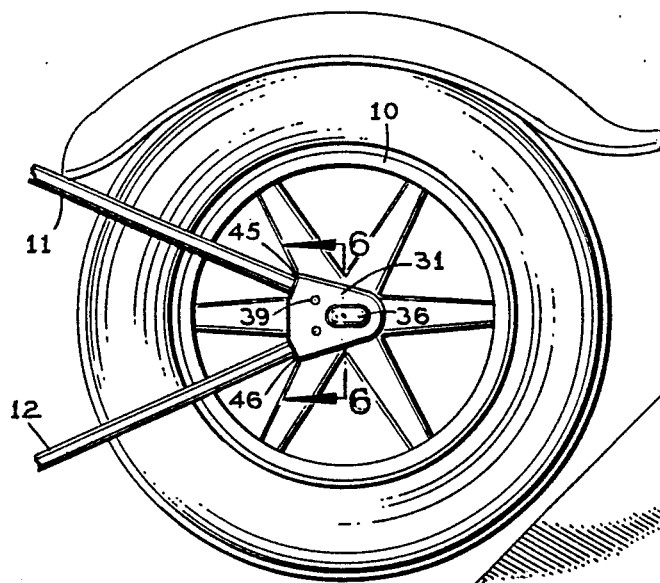
FIG. 1 is a side elevation of the rear wheel of a motorcycle provided with an axle cover assembly in accordance with this invention.

FIG. 1 shows the rear wheel 10 of a HARLEY-DAVIDSON "Softtail" motorcycle of known design. Upper and lower swing arms 11 and 12 carry a rear frame/axle horn 13 (FIG. 5) of known design which receives one end of the axle 14 of the rear wheel. A similar arrangement of upper and lower swing arms 11' and 12' (FIG. 6) and a rear frame/axle horn 13' is located on the opposite side of the motorcycle, and the rear frame/axle horn receives the corresponding end of the rear wheel axle 14. The rear frame/axle horn 13 has a vertically extending, laterally inwardly protruding wall 15 (FIG. 5) that is spaced a few inches in front of the rear wheel axle 14. This wall has a screw-threaded horizontal opening 16 that is horizontally aligned with axle 14.

Referring to FIG. 6, toward the left end of axle 14 a thrust collar 17 is slidably positioned on the axle. The inside face 17a of collar 17 engages the outside face 13b of the rear axle/frame horn 13. A clamping nut 18 is threadedly mounted on a reduced diameter screw-threaded extension 14b of the axle at this end. A flat metal washer 19 is engaged between nut 18 and the outside face 17b of thrust collar 17. As shown in FIG. 5, the axle frame/horn 13 has a horizontally elongated oblong opening 20 through which the axle 14 extends loosely, as shown in FIG. 6. The thrust collar 17 bears against the outside face 13b of the axle/frame horn 13 above and below this opening.

The opposite end of axle 14 has a flanged hex head 21 formal integral with the axle. A thrust collar 22 is slidably mounted on the axle next to the flange of its hex head 21. Thrust collar 22 is engaged between the flange of the hex head and the outside of an axle frame/horn 13', which is a mirror image of the horn 13 at the left end of the axle. Horn 13' has an oblong opening 20' through which the axle extends.

It will be understood that the nut 18 is tightened to clamp the axle 14 to the axle/frame horns 13 and 13' at its opposite ends.

As shown in FIG. 5, the thrust collar 17 on the left end of axle 14 in FIG. 6 is formed with a flat-bottomed notch or depression 23 on the outside at the front. Likewise, the thrust collar 17' on the other end of the axle has a similar notch or depression on the front.

An axle adjuster bolt 24 is threadedly received in the opening 16 of the transverse wall 15 of the axle/frame horn 13. This bolt has a hex head 25 on its front end in front of wall 15, and the tip 26 at its back end engages the bottom of notch 23 in thrust collar 17. A clamping nut 27 threadedly engages the screw-threaded shank of adjuster bolt 24 between the transverse wall 15 of the axle/frame horn 13 and the notch 23 in thrust collar 17.

In the prior art, with the nut 27 spaced from wall 15, the practice has been to turn the axle adjuster bolt 24 to position the thrust collar 17 (and thus the corresponding end of the rear wheel axle 14) at the desired front-to-back position on the motorcycle to provide the correct tension of the drive chain, not shown, from the engine to the rear wheel, after which the nut 27 has been clamped against the transverse wall 15 of the axle/frame horn 13 to hold the adjuster bolt in this position.

Figure 2:
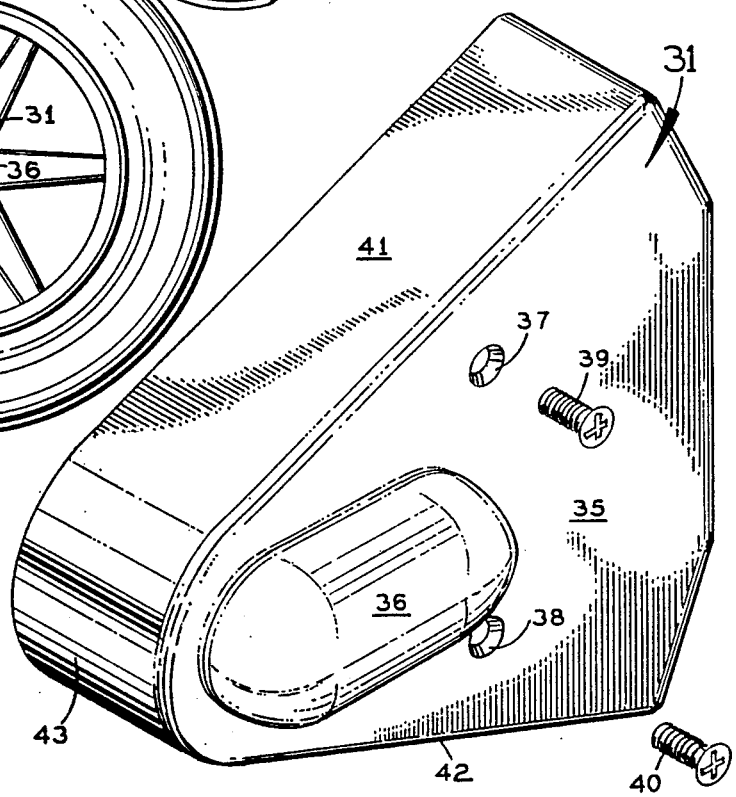
FIG. 2 is a perspective view of the outside of the cover in this assembly.

In accordance with one feature of the present invention, a mounting bracket 30 is engaged between the rear face of wall 15 and the front face of nut 27, as shown in FIG. 5. Bracket 30 is part of the cover assembly, the other main part of which is a cover 31, as best seen in FIG. 2. Bracket 30 (FIG. 7) has a central horizontal opening 32 which, as shown in FIG. 5, registers with the screw-threaded opening 16 in the transverse wall 15 of the axle/frame horn 13 and slidably passes the stem of adjuster bolt 24 when these parts are assembled. Bracket 30 has screw-threaded openings 33 and 34 near its opposite ends for receiving attachment screws that fasten cover 31 to the bracket.

Figure 3:
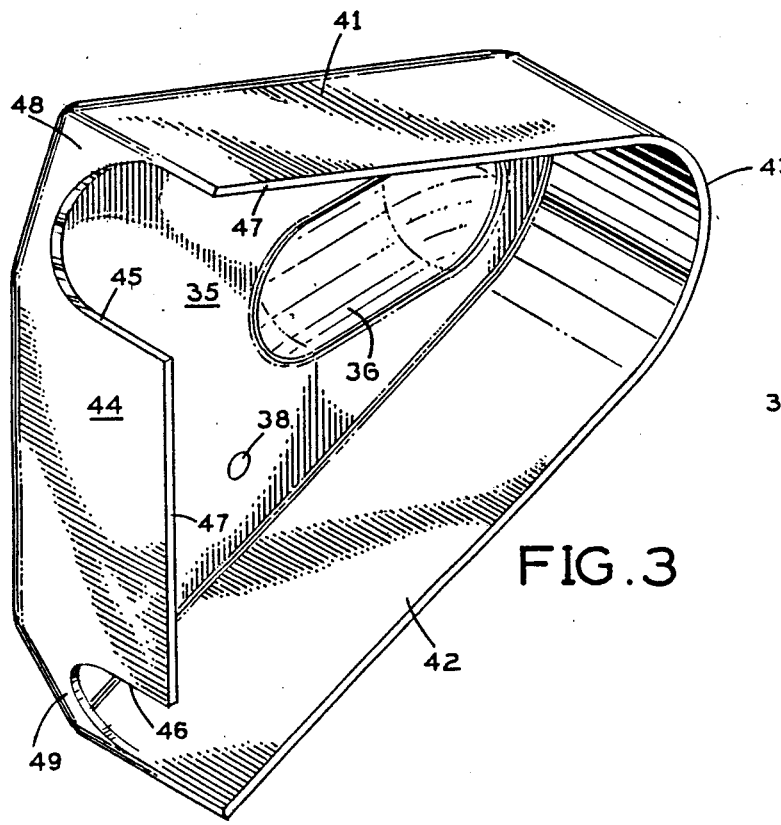
FIG. 3 is a perspective view of the inside of this cover.
Figure 4:
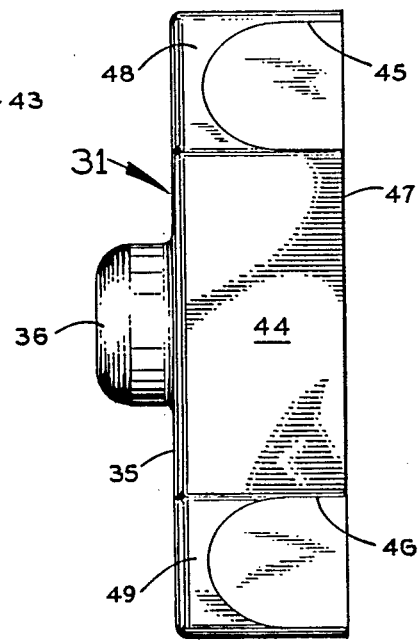
FIG. 4 is a front end elevation of this cover.

Referring to FIGS. 2, 3 and 4, the cover 31 has a generally flat outer wall 35 with an integral, outwardly projecting, hollow segment 36 toward its back end which is open at the axially inboard side of the cover. In front of this segment the outer wall has upper and lower frusto-conical openings 37 and 38 for seating the heads of attachment screws 39 and 40, which are threadedly received in the openings 33 and 34 in mounting bracket 30 to attach cover 31 to this bracket.

Cover 31 has a flat, downwardly and rearwardly inclined top wall 41 and a flat, upwardly and rearwardly inclined bottom wall 42 joined to the top wall by an arcuate rear wall 43, which merges smoothly with the top and bottom walls. At the front the cover has a vertical wall 44 (FIG. 3) extending between an upper front opening 45 and a lower front opening 46, both of which are open at the inner edge 47 of the cover. Upper opening 45 is in a rearwardly and upwardly inclined, flat, upper front wall segment 48 of the cover. Opening 46 is in a rearwardly and downwardly inclined, flat, lower front wall segment 49 of the cover.

As shown in FIGS. 1 and 5, in the assembled position of the parts, the upper opening 45 in the front of the cover passes the upper swing arm 11 and the lower opening 46 passes the lower swing arm 12. Except at these openings the cover 31 fits completely around the rear axle/frame horn 13, with the top, bottom, rear and front walls 41,42,43,44,48 and 49 extending laterally inward past the horn 13, as shown in FIG. 6 for the top and bottom walls 41 and 42. The outer wall 35 extends completely across outboard the side of horn 13 and its outwardly protruding segment 36 accommodates the nut 18 and the projecting end 14b of axle 14.

This cover assembly is attached to the rear frame/axle horn 13 on the front ends of the upper and lower swing arms 11 and 12 as follows:

With the axle adjuster bolt 24 retracted from engagement with the thrust collar 17 on this end of the rear wheel axle 14 and with the clamping nut 27 removed from bolt 24, the support bracket 30 is slid along the threaded stem of bolt 24 unitl it abuts against the rear face of the transverse wall 15 of horn 13. Nut 27 is put on the bolt 24, and the bolt is turned to bring its tip 26 into engagement with the thrust collar 17 on axle 14 at notch 23 in this collar. Then, nut 27 is tightened against the back of support bracket 30 to hold the adjuster bolt in this position. The cover 31 is slipped over the rear frame/axle horn 13 from the outside until the inside face of its outer wall 35 engages the outside face of support bracket 30. In this position, the cover 31 completely covers the thrust collar 17, nut 18 and the protruding end of axle 14, the mounting bracket 30, the adjuster bolt 24 and the clamping nut 27. The openings 37 and 38 in cover 31 are aligned with the opening 33 and 34 in mounting bracket 30 and the screws 39 and 40 are inserted to attach the cover to the mounting bracket.

The cover assembly at the opposite end of axle 14 is a mirror image of the one just described and corresponding elements of its are given the same reference numerals but with a "prime" suffix in FIG. 6. The manner in which this cover assembly is mounted on the frame/axle horn 13' at this end of the axle is the same as described.

The cover 31 may be of stamped, chrome plated steel or of billet aluminum, plated, so as to give the desired "custom look", as well as covering the projecting parts of the wheel axle to promote safety.

For HARLEY-DAVIDSON models other than the "Softtail" model, the shapes and dimensions of the mounting bracket and cover may be modified, as necessary, to provide a proper fit.

I claim:

1. An axle cover assembly for a motorcycle having a rear wheel axle,
a frame/axle horn on one side of said motorcycle having an opening which passes an end of said axle on said one side of the motorcycle, said horn having a transverse wall spaced in front of said axle and presenting a screw-threaded opening horizontally aligned with said end of said axle,
an axle adjuster bolt threadedly received in said screw-threaded opening for adjusting the position of said end of said axle,
and a nut threaded onto said bolt between said transverse wall and said axle,
said cover assembly comprising:
a mounting bracket having a horizontal opening for slidably passing said axle adjuster bolt in front of said transverse wall of said horn and behind said nut, whereby said bracket can be clamped against said transverse wall by said nut, said bracket extending above and below said horizontal opening therein;
and a cover shaped and dimensioned to fit over said horn, said end of said axle, said adjuster bolt, said nut and said bracket on the axially outboard side thereof;
and fasteners attaching said cover to said bracket above and below said horizontal opening therein.

2. A cover assembly according to claim 1 wherein:
said bracket has screw-threaded openings above and below said horizontal opening;
said cover has openings that register with said screw-threaded openings in said bracket;
and said fasteners are screws extending through said openings in said cover and threadedly received in said screw-threaded openings in said bracket.

3. A cover assembly according to claim 2 wherein:
said cover has an outwardly projecting hollow segment which is open at the axially inboard side of the cover for receiving the adjacent end of the axle projecting laterally outward beyond said bracket.

4. A cover assembly according to claim 1 wherein:
said cover has an outwardly projecting hollow segment which is open at the axially inboard side of the cover for receiving the adjacent end of the axle projecting laterally outward beyond said bracket.

5. An axle cover assembly for a motorcycle having a rear wheel axle,
a frame/axle horn on one side of said motorcycle having an opening which passes an end of said axle on said one side of the motorcycle, said horn having a transverse wall spaced in front of said axle and presenting a screw-threaded opening horizontally aligned with said end of said axle,
an axle adjuster bolt threadedly received in said screw-threaded opening for adjusting the position of said end of said axle,
and a nut threaded onto said bolt between said transverse wall and said axle,
said cover assembly comprising:
a mounting bracket having means for positioning it on said axle adjuster bolt between said transverse wall of said horn and said nut so as to be clamped against said transverse wall by said nut;

a cover recessed on an inner edge and shaped and dimensioned to cover said horn, said end of the axle, said adjuster bolt, said nut and said bracket on the axially outboard side thereof;

and means for attaching said cover to said mounting bracket.

* * * * *